United States Patent [19]

Capitanescu

[11] Patent Number: 5,205,469
[45] Date of Patent: Apr. 27, 1993

[54] WELD OVERLAY DEVICE AND METHOD

[76] Inventor: Dan Capitanescu, 4031 Rundlehorn Dr. N.E., Calgary, Alberta, Canada, T1Y 2K2

[21] Appl. No.: 928,786

[22] Filed: Aug. 13, 1992

[51] Int. Cl.[5] .......................... B23K 9/18; B23K 9/04
[52] U.S. Cl. .................................. 228/225; 228/242; 219/76.14; 219/125.1
[58] Field of Search .............. 228/119, 214, 223, 225, 228/226, 242; 219/76.1, 76.14, 125.1, 125.11, 136

[56] References Cited

U.S. PATENT DOCUMENTS

| | | | |
|---|---|---|---|
| 4,527,039 | 7/1985 | Füwesi | 228/119 |
| 4,539,460 | 9/1985 | Herrmann et al. | 219/76.14 |
| 4,853,513 | 8/1989 | Fuimefreddo | 219/76.14 |

*Primary Examiner*—Samuel M. Heinrich

[57] ABSTRACT

A method of applying a welded overlay to the interior surface of curved hollow articles such as 90 degree elbows utilizing a submerged arc welding gun curved to follow the radius of the hollow article and comprised of an elongated cylindrical body (27) and a curved weld head (10), welding tip holder (24) and welding tip (28) and incorporating a flux conveying system (16), (18) and (20) and a plurality of air release slots (22) by which the flow of flux to the weld area is controlled. A first series of overlapping welds is applied longitudinally to the interior surface of the hollow article to cover 90 degrees of the surface therein. The article is rotated and a second series of overlapping welds are applied 180 degrees from the first series and again covering 90 degrees of the interior surface. A third series of overlapping welds are applied beginning at either of the end welds of the first series and covering 90 degrees of the interior surface. A forth and final series of overlapping welds are applied, 180 degrees from the third series, covering the remaining 90 degrees of the interior surface.

6 Claims, 5 Drawing Sheets

WELD OVERLAY DEVICE AND METHOD

BACKGROUND

1. Field of Invention

This invention relates to submerged arc welding; more specifically the application of a weld overlay to the interior surface of angular, hollow vessels.

2. Description of Prior Art

Since the introduction of electroslag welding by the USSR at the Brussel's World Fair in 1958, many advancements in the art have occured, particularly in respect to electroslag surfacing, where much has been gained both technically and economically.

At the most basic level, welding is a process in which two materials -usually metals-are permanently joined together by coalescense resulting from a combination of temperature, pressure and metallurgical conditions. The particular combination of temperature and pressure can range from high temperature with little or no pressure to high pressure with no increase in temperature. Thus welding can be accomplished under a wide variety of conditions, resulting in the development of numerous welding processes which are routinely used for a variety of purposes.

Given the variety and flexibility of welding techniques available, it is no surprise, then, that surfacing by welding is extensively used for the reclaimation of items damaged in service and to "hard-face" the exposed surfaces of thick walled vessels.

While all the major welding processes can be used for surfacing, the use of submerged arc welding is particularly advantageous in that the arc is maintained beneath a blanket of granular flux thus, effectively eliminating the operator's need for specialized safety clothing. The flux provides excellent shielding of the molten metal and, because the pool of molten metal is relatively large, good fluxing action occurs to remove any impurities. A portion of the flux is melted and solidifies into a glass-like covering over the weld. This, along with the flux which is not melted, provides a thermal coating that slows the cooling of the weld area and helps to produce a soft, ductile weld. The solidified flux cracks loose from the weld upon cooling (because of the differential thermal contraction) and is easily removed. Thus, submerged arc welding typically produces welds of extremely high quality using either AC or DC as the power source.

Many techniques and apparatuses for applying a weld overlay to both rectilinear and tubular surfaces utilizing submerged arc welding are to be found in the patent literature and are cited and discussed in the disclosure and specifications of Canadian Patent number 2010872 issued August 1991 to the inventor of the present invention, wherein is disclosed a device to apply longitudinally extending welds to the interior of a hollow tubular vessel, while rotating the vessel between each weld application.

One major disadvantage associated with the devices and techniques heretobefore disclosed is that such devices and techniques make no provision for applying a weld overlay to a curved hollow vessel; for example, ninety degree elbows with varying radii.

While this above mentioned shortcoming may be obviated by the modification of the device disclosed in my patent to the subject matter of the present invention nevertheless all heretobefore described devices suffer from the following shortcomings:

(a) they are restricted in use to providing a weld overlay on straight vessels;
(b) they are relatively complex in construction and use; and
(c) they require relatively high maintenance.

OBJECTS AND ADVANTAGES

Accordingly, besides the objects and advantages of the device presented in my above patent, several objects and advantages of the present invention are:

(a) to provide a relatively simple device for performing submerged arc welding on the interior of a curved, hollow vessel such as a ninety degree elbow;
(b) to provide an efficient method of coating the interior surface, by submerged arc welding means, of a curved hollow vessel using the device described herein;
(c) to provide a method of surfacing the interior of a curved hollow article by welding such that a substantially smooth weld is produced which serves to reduce the possibility of weld defects commonly occuring by virtue of irregular weld deposits; and
(d) to provide a method of coating the interior surface of curved hollow articles utilizing a submerged arc welding device of relatively simple construction and inexpensive manufacture.

Further objects and advantages are to provide an automated system of applying a weld overlay to curved hollow articles requiring a minimum of supervisory control. Still further objects and advantages will become apparent from a consideration of the ensuing drawings and description.

DRAWING FIGURES

In the drawings closely related figures have the same number but different alphabetical suffixes.

Figure 1:
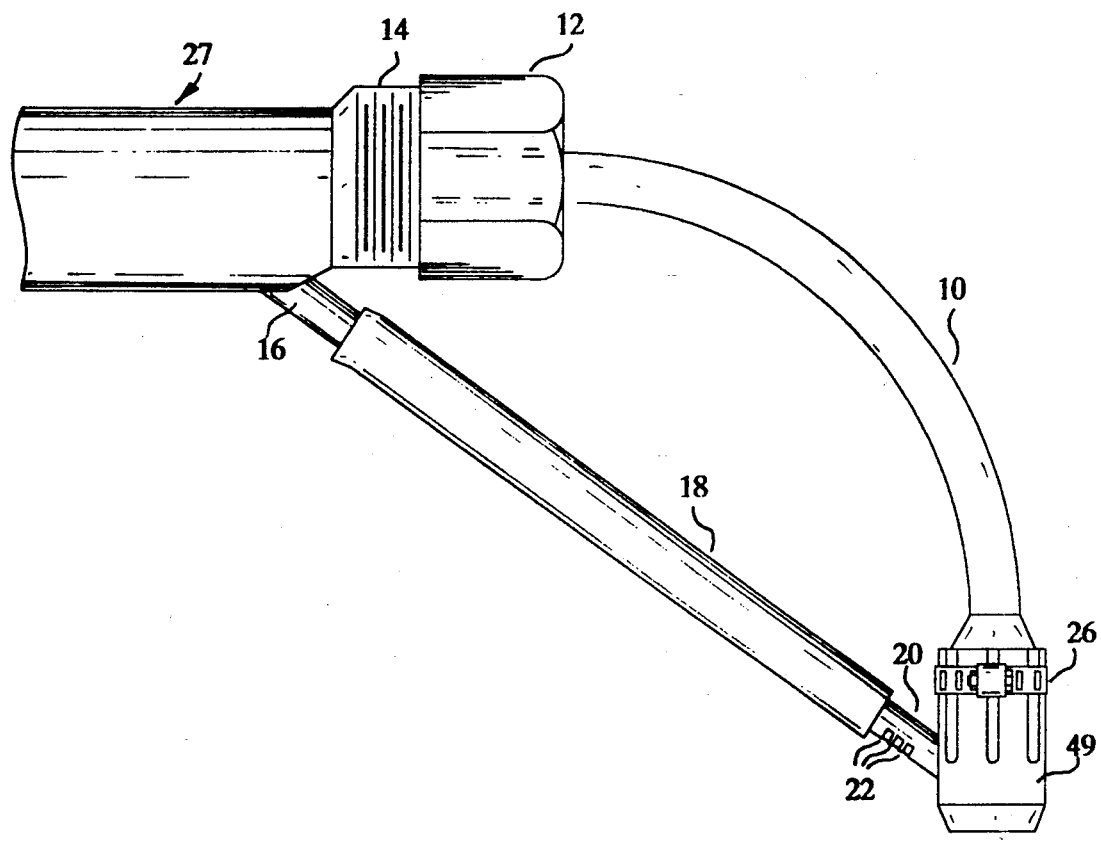
FIG. 1 is a partial view of the welding gun showing the placement of the weld head and flux supply system.

FIG. 5, A to D is a schematic representation of the order of placement of the individual longitudinal weld strips within the interior body of the curved article.

| Component Reference Numerals in Drawings | | | |
|---|---|---|---|
| 10 | weld head main body | 11 | weld wire conduit |
| 12 | weld head body end connector | 14 | weld gun body end connector |
| 16 | gun body flux outlet | 18 | flux feed tube |
| 20 | weld head flux inlet tube | 22 | air release slots |
| 24 | tip holder | 26 | hose clamp |
| 27 | weld gun body | 28 | contact tip |
| 30 | tip holder wire guide | 32 | tip wire guide |
| 34 | weld head end plug | 35 | brazed joints |
| 36 | gun insulating casing | 38 | gun main body tube |
| 40 | coolant tube | 42 | weld wire feed tube |
| 44 | end connector wire guide | 46 | end plug wire guide |
| 48 | ninety degree elbow | 49 | flux collector. |

Figure 2:
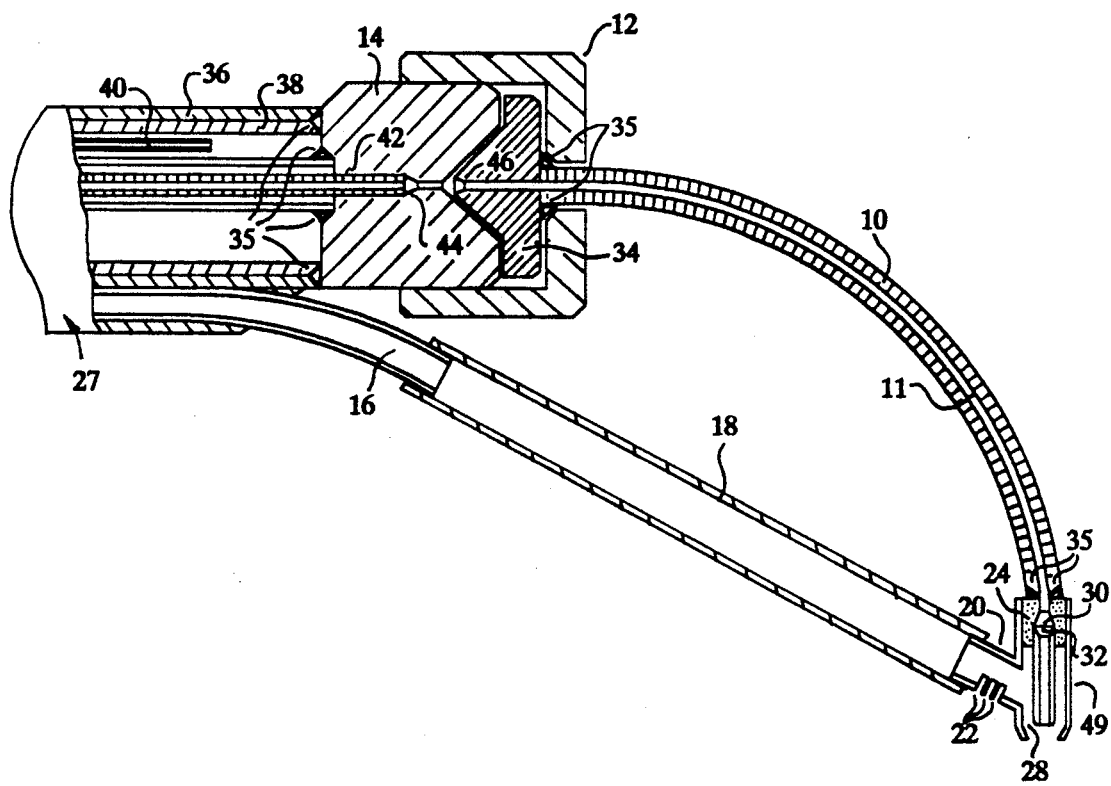
FIG. 2 is a sectional view of the welding gun showing the internal configuration of the weld head and flux supply system.
Figure 3:
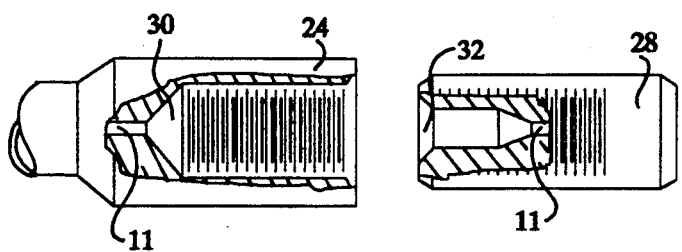
FIG. 3 is a detailed view of the internal configuration of the weld head tip.

DESCRIPTION—FIGS. 1 to 3

A typical embodiment of the device of the present invention is illustrated having reference to the above mentioned figures and, in essence, is an improvement on the device disclosed in my Canadian patent, 2010872, August 1991 which consists of a weld gun 27 comprised of an elongated, cylindrical, tubular casing 36 formed of electrically insulating material.

One end of the casing 36 is connected via a steel sleeve (not shown) to a brass block (not shown) which incorporates coolant discharge means and a connecting means for coupling the structure to a submerged arc welding tractor (not shown) which conveys the apparatus in a pipe or other hollow article.

The casing 36 houses an electrically conductive gun main body tube 38 extending substantially the entire length of the casing 36 near the top thereof and mounted at one end to the brass block. The other end of the main body tube 38 is permanently affixed by conventional brazing means to an inner surface of a gun body end connector 14.

Further included within the confines of the gun body tube 38 is a weld wire feed tube 42 formed from rigid, resilient material such as teflon, and supported at one end by insertion into the gun body end connector 14 and at the other end by insertion into the block connector (not shown) and having an internal diameter sufficient to provide a clearance fit to a consumable weld wire (not shown). The wire feed tube 42 is, in turn, encased within another tube which is permanently affixed at one end to the end connector 14 by conventional means such as brazing.

The weld gun 27 further includes a coolant tube 40 located within the confines of the main body tube 38 and a gun body flux outlet tube 16 located to the outside of the main body tube 38 and within the confines of the insulating casing 36 and extending outward and downward from the plane of the gun 27.

The gun body end connector 14 is comprised of a generally cylindrical shaped structure of solid, electrically conductive rigid material having external threads and a centrally machined hole through the inner surface extending approximately half the length of the connector 14 and of a diameter sufficient to provide for a clearance fit for the insertion of one end of a weld wire feed tube 42. The machined hole tapers at its bottom end to provide a weld wire feed guide 44 and continues through the body of the connector 14 with a diameter sufficient to provide a clearance fit to the diameter of a consumable weld wire (not shown). An exit hole on the outer body of the connector 14 terminates in an enlarged conical depression of dimensions sufficient to provide a clearance fit to a matching conical protuberance incorporated in the body of a weld head end plug 34.

The weld head end plug 34 is comprised of an electrically conductive generally cylindrical shaped structure of an overall outer diameter slightly smaller than the diameter of the end connector 14 and incorporates on one surface an integral conical protuberance of dimensions sufficient to provide for an insertable clearance fit to the matching depression of the end connector 14 and a smaller conical depression machined into the plateau of the conical protuberance such as to form a wire guide 46 and continuing as a through hole of a diameter sufficient to provide for a clearance fit to the diameter of a consumable weld wire (not shown).

Extending outward and downward from the opposite surface of the end plug 34 and permanently affixed to said surface by conventional brazing means is a weld head main body 10 comprised of a curved tube formed of electrically conductive rigid material, such as copper, having an internal diameter substantially equal to the diameter of the through holes in both the end plug 34 and the connector 14 such that, when in alignment with the through holes in the end plug 34 and the connector 14 the resultant channel thus formed serves as a consumable weld wire conduit 11.

A weld head body end connector 12 consisting of an electrically conductive threaded pipe fitting of conventional design surrounds and captures the end plug 34 and the head main body 10 such that the end plug 34 and the main body 10 are removably insertable into the weld gun 27 by threading the end connector 12 over the weld gun body end connector 14.

The opposite end of the weld head main body 10 terminates and is permanently affixed by conventional brazing means 35 to a tip holder 24 comprised of a contact tip 28 and a flux collector 49. The flux collector 49 is removably attached to the tip holder 24 by hose clamp means 26 and is comprised of a flux inlet 20 and a plurality of air release slots 22.

The contact tip holder 24 consists of a female threaded fitting incorporating a machined conical depression which forms an upper tip holder wire guide 30.

The contact tip 28 consists of a male threaded fitting incorporating a machined conical depression which forms a lower tip wire guide 32.

When assembled, one within the other, the wire guide 30 of the contact tip holder 24 and the wire guide 32 of the contact tip 28 form a continuation of the consumable weld wire conduit 11.

The air release slots 22 are machined into the body of the flux inlet 20 and control the flow of flux to the weld area. In the present embodiment it has been found that three such slots each ¼"×1/16" and spaced ¼" apart provide for the most desirable flux flow under a wide variety of operating conditions.

Both the flux outlet 16 and the flux inlet 20 are connected by a standard flexible tube affixed at each end by any conventional means.

Figure 4:
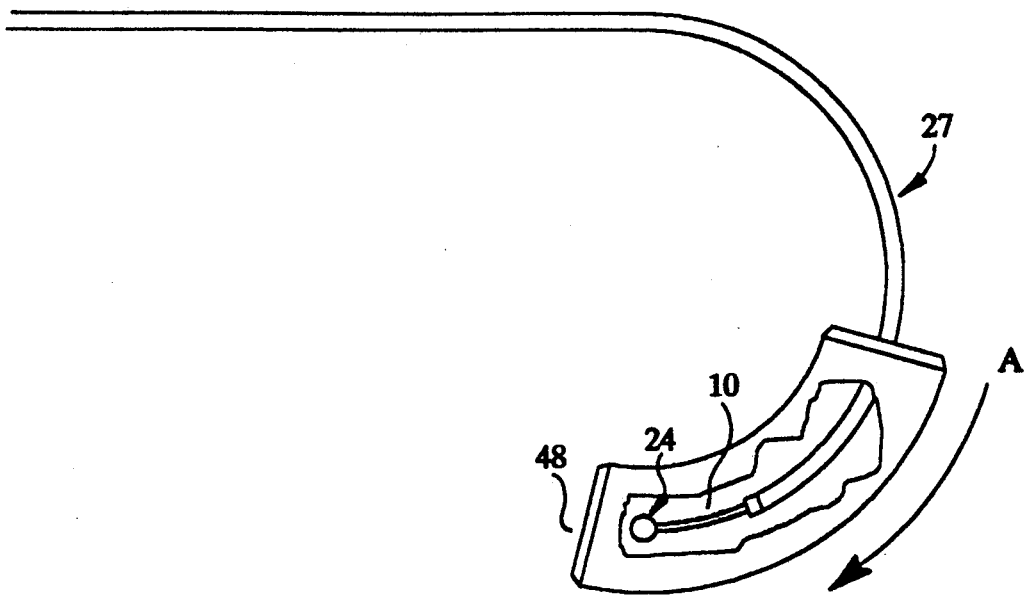
FIG. 4 to 4B is a schematic illustration of the method by which longitudinal weld strips are applied to the interior surface of a typical curved article.
Figure 5D:
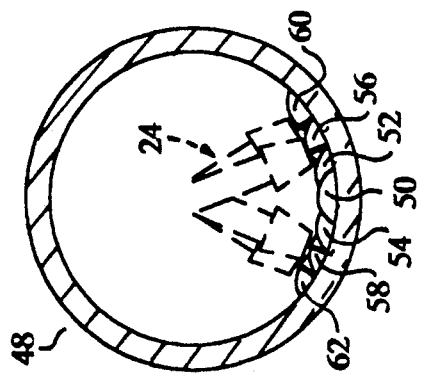

OPERATION—FIGS. 4 to 5D

Figure 5C:
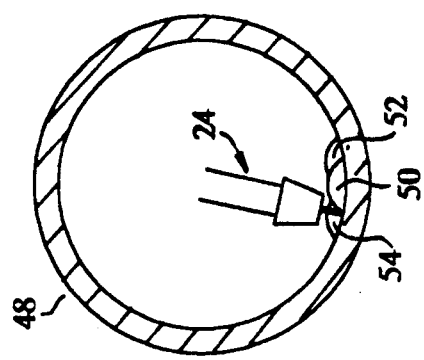
Figure 5B:
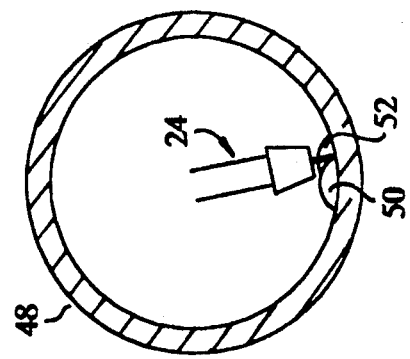
Figure 5A:
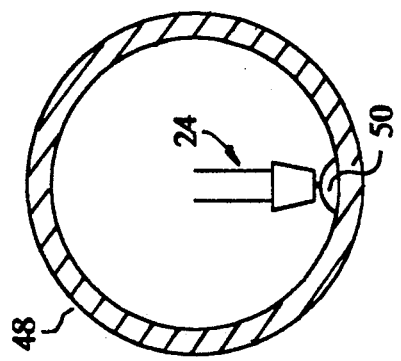

The curvature of the gun 27 combined with the curvature of the weld head main body 10 are selected such as to provide a radius substantially equal to the radius of the elbow 48 to be coated. The elbow 48 to be overlaid is secured to a rotatable platform with the gun 27 inserted into the elbow as illustrated in FIG. 4. The weld gun 27 is activated and the elbow 48 rotated at a set rate such as to provide for the even deposition of a longitudinal weld strip 50 to the interior surface of the elbow 48 in the starting position of zero degrees (FIG. 5A).

With the elbow 48 and the head main body 10 in the starting position of zero degrees (FIG. 5A) the head main body 10 is rotated off the zero degree mark such that the elbow 48 is positioned to the starting point of the first weld pass 50 and the weld head 10 to the right of and adjacent to the first weld pass 50. The gun 27 is again activated as the elbow 48 rotates and a second longitudinal weld strip 52 performed such that the weld strips 50 and 52 overlap. (FIG. 5B).

The elbow 48 is rotated back to the start position such that the weld head 10 is positioned to the starting point of the previous weld passes 50 and 52 respectively and to the left of and adjacent to the first weld pass 50. As the elbow 48 is again rotated a third longitudinal weld strip 54 is laid down such as to overlap the first weld strip 50. (FIG. 5C). Welding continues in this manner-alternating left to right-until the welded strips constitute a combined coverage of 45 degrees to either side of the zero degree starting mark, i.e., as shown in FIG. 5D, weld 50 will be located at the zero degree mark and welds 60 and 62 will be located at forty five degrees to the right and left respectively of the first weld 50 and all welds overlap, forming a substantially smooth coating.

Figure 4A:
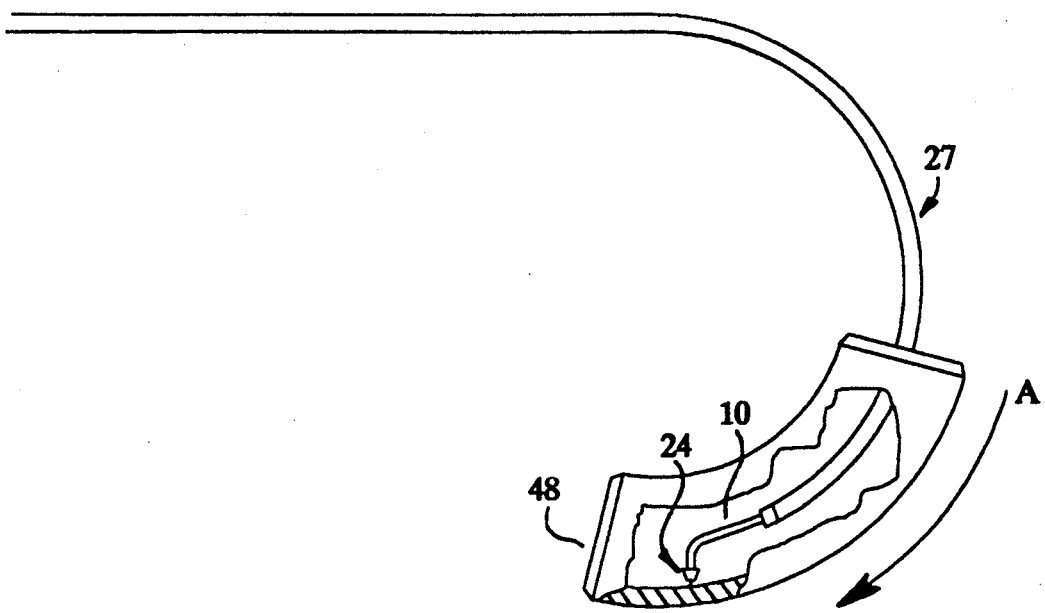
Figure 4B:
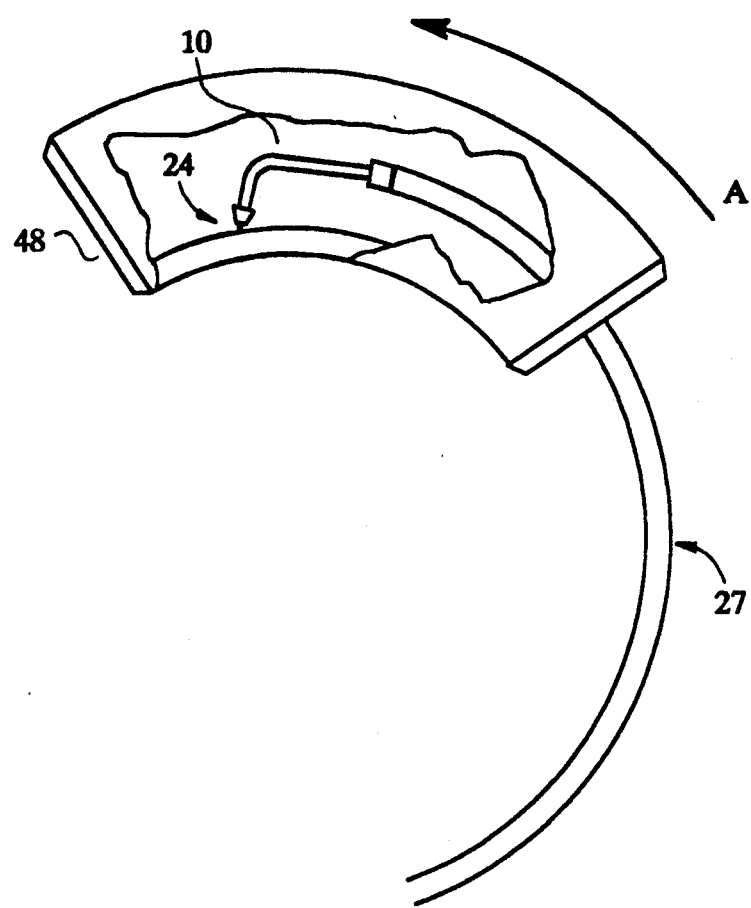

The elbow 48 is repositioned as shown in FIG. 4A with the opposite side down and the process described above repeated such that the ensuring series of longitudinal weld are located 180 degrees from the first series. It will be understood that the elbow 48 is repositioned in this fashion four times and a series of welds made each time wherein each series of welds provides coverage of 90 degrees of the interior elbow 48 surface and each series of welds commences 180 degrees from the prior series.

Accordingly the reader will see that the submerged are welding device of the present invention can be constructed with a curvature conducive to the radius of a variety of curved hollow articles without departure from the basic structure as described herein and, therefore, can accommodate the interior coating of such articles over a wide range of dimensional variation. Furthermore the submerged arc welding device of the present invention has the additional advantages in that it is of relatively simple construction;
it requires little maintenance;
it provides consistant weld quality; and
it places few demands on the technical skills of the operator.

Although the description herein contains many specificities, these should not be construed as limiting the scope of the present invention but as merely providing an illustration of the presently preferred embodiment of the invention. For example, the above description contemplates movement of the curved hollow article and a fixed welding gun whereas it is entirely within the scope of the present disclosure to move the gun and fix the article or any combination of desirable movement. Likewise, the conveying of flux to the weld may be accomplished by any convenient method and any practical departure from the cylindrical shape of the gun may be made without adverse effects on the performance of the system etc.

Thus the scope of the invention should be determined by the appended claims and their legal equivalents, rather than by the examples provided.

I claim:

1. A method for the overlaying of the interior surface of a curved hollow article comprising the steps of:

applying a first pass series of longitudinal overlapping welds by welding means curved to follow the curvature of said hollow article wherein said first pass overlapping welds cover 90 degrees of said interior surface of said hollow article;

rotating said hollow article and applying a second pass series of longtudinal overlapping welds by said welding means wherein said second pass series of welds are located 180 degrees from said first pass series of overlapping welds and said second pass series of overlapping welds covers 90 degrees of said interior surface of said hollow article;

rotating said hollow article and applying a third pass series of longitudinal overlapping welds by said welding means wherein said third pass series of overlapping welds commences adjacent to either end of said first pass series of overlapping welds and ends by overlapping the corresponding end weld of said second pass series of overlapping welds with said third pass series of overlapping welds covering 90 degrees of said interior surface of said hollow article; and rotating said hollow article and applying a forth pass series of overlapping welds by said welding means wherein said forth pass series of overlapping welds are located 180 degrees from said third pass series of overlapping welds and said forth series of overlapping welds covers 90 degrees of said interior surface of said hollow article.

2. The curved welding means of claim 1 wherein said welding means is comprised of an elongate cylindrical submerged are welding gun and wherein the improvement comprises:

a curved weld head of rigid electrically conductive tubular material removably insertable to the end of said submerged arc welding gun; and a flux supply means wherein welding flux is continuously conveyed from the body of said welding gun to the weld area.

3. The weld head of claim 2 further including a contact tip holder and a contact tip comprised of threaded, drilled and matched male and female fittings wherein said male fitting is permanently affixed to one end of said curved weld head.

4. The flux supply means of claim 2 wherein said flux supply means is comprised of a flux outlet port extending outward and downward from said welding gun and in alignment with a flux inlet port extending outward and upward from said weld head.

5. The flux supply means of claim 4 further including a connecting means whereby flux is conveyed from said flux outlet port to said flux inlet port.

6. The flux inlet port of claim 4 further including an air release means whereby the flow of flux is controllable.

* * * * *